United States Patent
Mori et al.

[11] Patent Number: 6,058,225
[45] Date of Patent: May 2, 2000

[54] INFORMATION REPRODUCTION SYSTEM WHICH FEEDBACK CONTROLS A PULSE WIDTH OF LIGHT SOURCE PULSES DURING MANUAL SCANNING OF AN OPTICALLY READABLE DOT CODE

[75] Inventors: Takeshi Mori, Machida; Kosei Tamiya, Sagamihara, both of Japan

[73] Assignee: Olympus Optical Co., Ltd., Tokyo, Japan

[21] Appl. No.: 08/947,241

[22] Filed: Oct. 8, 1997

Related U.S. Application Data

[62] Division of application No. 08/611,653, Mar. 6, 1996, Pat. No. 5,724,364.

[30] Foreign Application Priority Data

Mar. 16, 1995 [JP] Japan .................................. 7-056911

[51] Int. Cl.⁷ .................................................. G06K 9/20
[52] U.S. Cl. ............................................................ 382/321
[58] Field of Search .................................. 382/232, 312, 382/321; 235/375, 436, 454, 460, 462.01, 462.05, 462.07, 462.09, 462.32, 472.01

[56] References Cited

U.S. PATENT DOCUMENTS

| | | | |
|---|---|---|---|
| 4,282,425 | 8/1981 | Chadima, Jr. et al. . | |
| 4,713,536 | 12/1987 | Williams et al. | 235/462.05 |
| 4,771,165 | 9/1988 | van Hulzen et al. | 235/470 |
| 5,042,079 | 8/1991 | Morikawa et al. | 382/58 |
| 5,327,510 | 7/1994 | Morikawa et al. | 382/58 |
| 5,369,261 | 11/1994 | Shamir | 235/469 |
| 5,400,415 | 3/1995 | Kobayashi | 382/51 |
| 5,517,018 | 5/1996 | Zheng et al. . | |
| 5,568,555 | 10/1996 | Shamir | 380/51 |
| 5,572,006 | 11/1996 | Wang et al. . | |
| 5,591,957 | 1/1997 | Morikawa et al. | 235/494 |
| 5,623,479 | 4/1997 | Takahashi | 369/275.5 |
| 5,644,557 | 7/1997 | Akamine et al. | 369/14 |
| 5,724,364 | 3/1998 | Hori et al. | 371/6 |
| 5,874,718 | 2/1999 | Matsui | 235/494 |
| 5,886,335 | 3/1999 | Matsueda | 235/436 |
| 5,897,669 | 4/1999 | Matsui | 235/462 |
| 5,943,448 | 8/1999 | Tatsuta | 382/270 |

FOREIGN PATENT DOCUMENTS

| | | |
|---|---|---|
| 57-166672 | 10/1982 | Japan . |
| 59-61383 | 4/1984 | Japan . |
| 64-1829 | 1/1989 | Japan . |

*Primary Examiner*—Jose L. Couso
*Attorney, Agent, or Firm*—Frishauf, Holtz, Goodman, Langer & Chick, P.C.

[57] ABSTRACT

A period extracting section extracts a specific period in a dot code in an image signal corresponding to the dot code, and this specific period is supplied field by field to a maximum value detection section and a minimum value detection section via a detection gate. A threshold value detection section computes the binary threshold value from the detected field-by-field maximum value and minimum value, and holds it in a data holding section. A comparator compares the held threshold value with an image signal with the dot period emphasized by a signal processor to thereby binarize the image signal corresponding to the dot code.

4 Claims, 10 Drawing Sheets

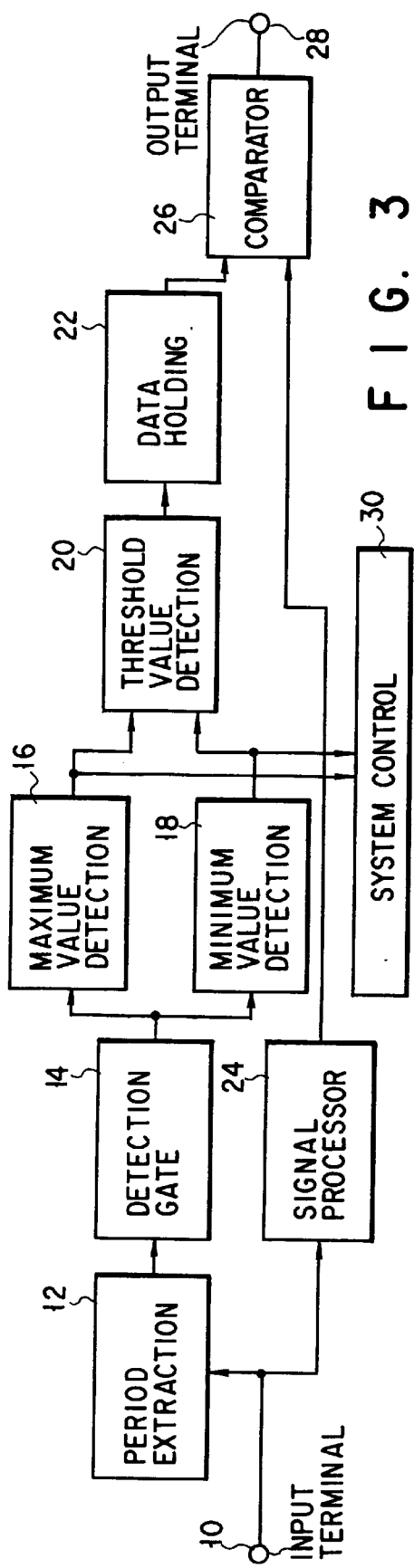
FIG. 3
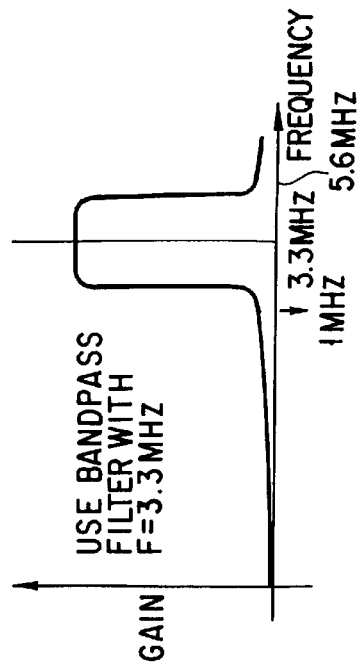
FIG. 5B
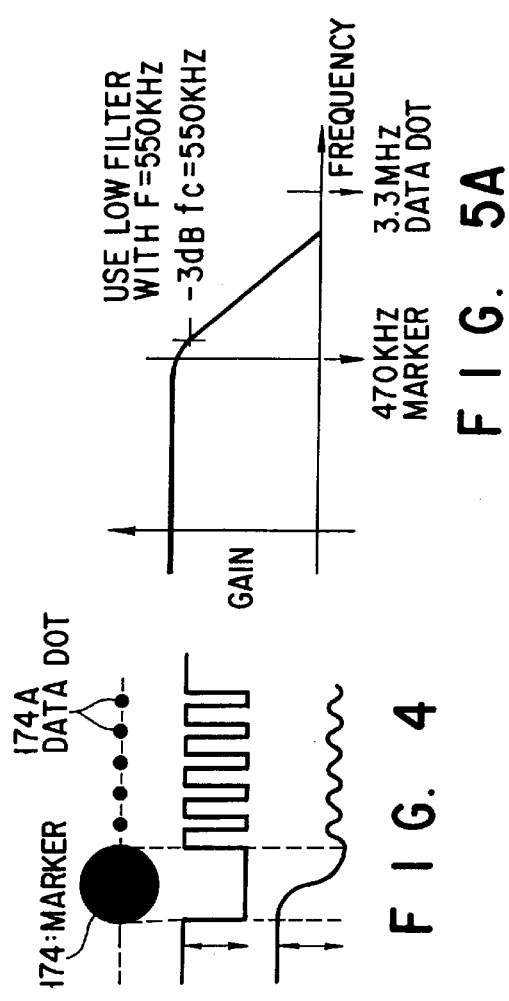
FIG. 5A
FIG. 4

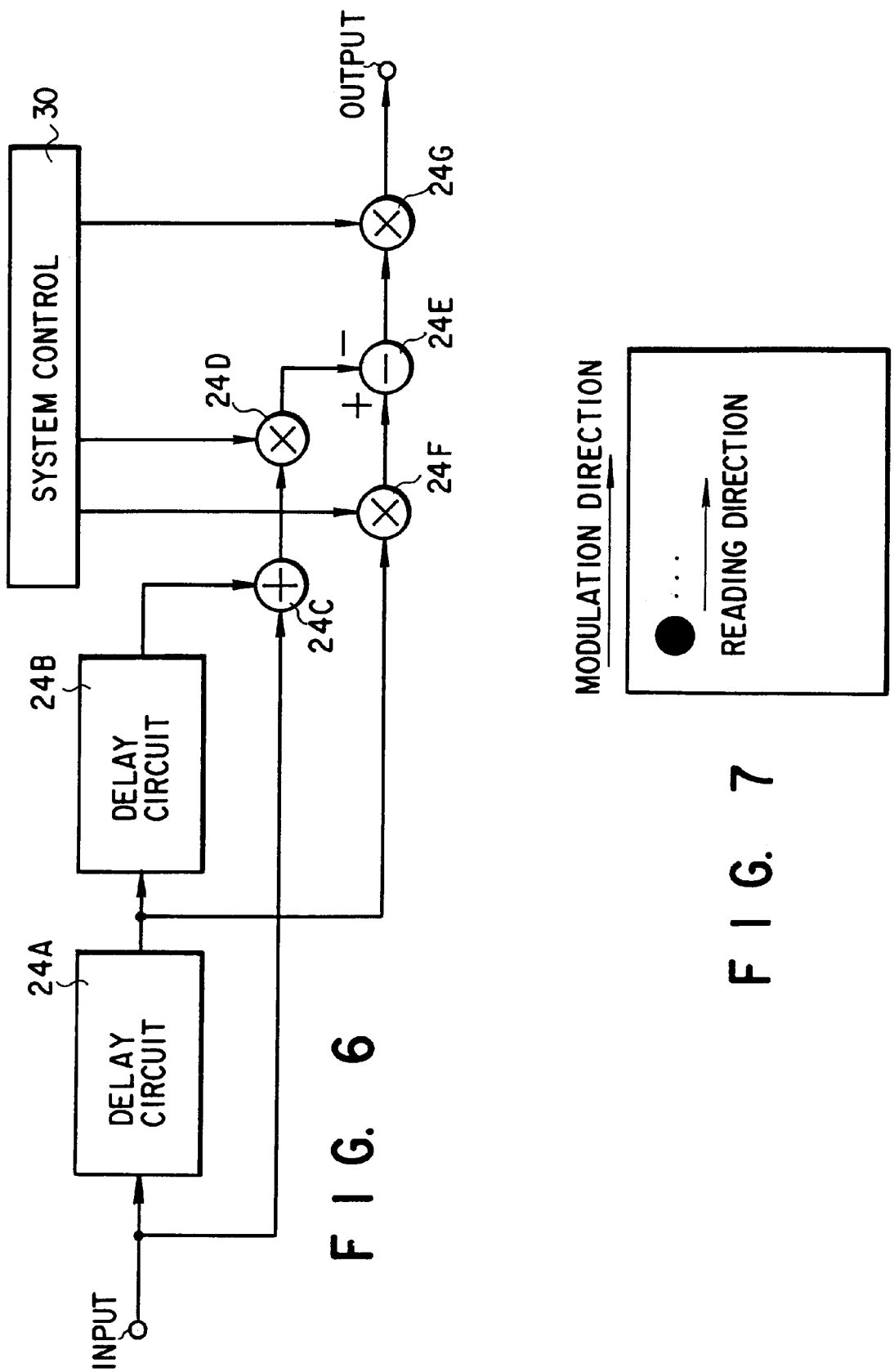

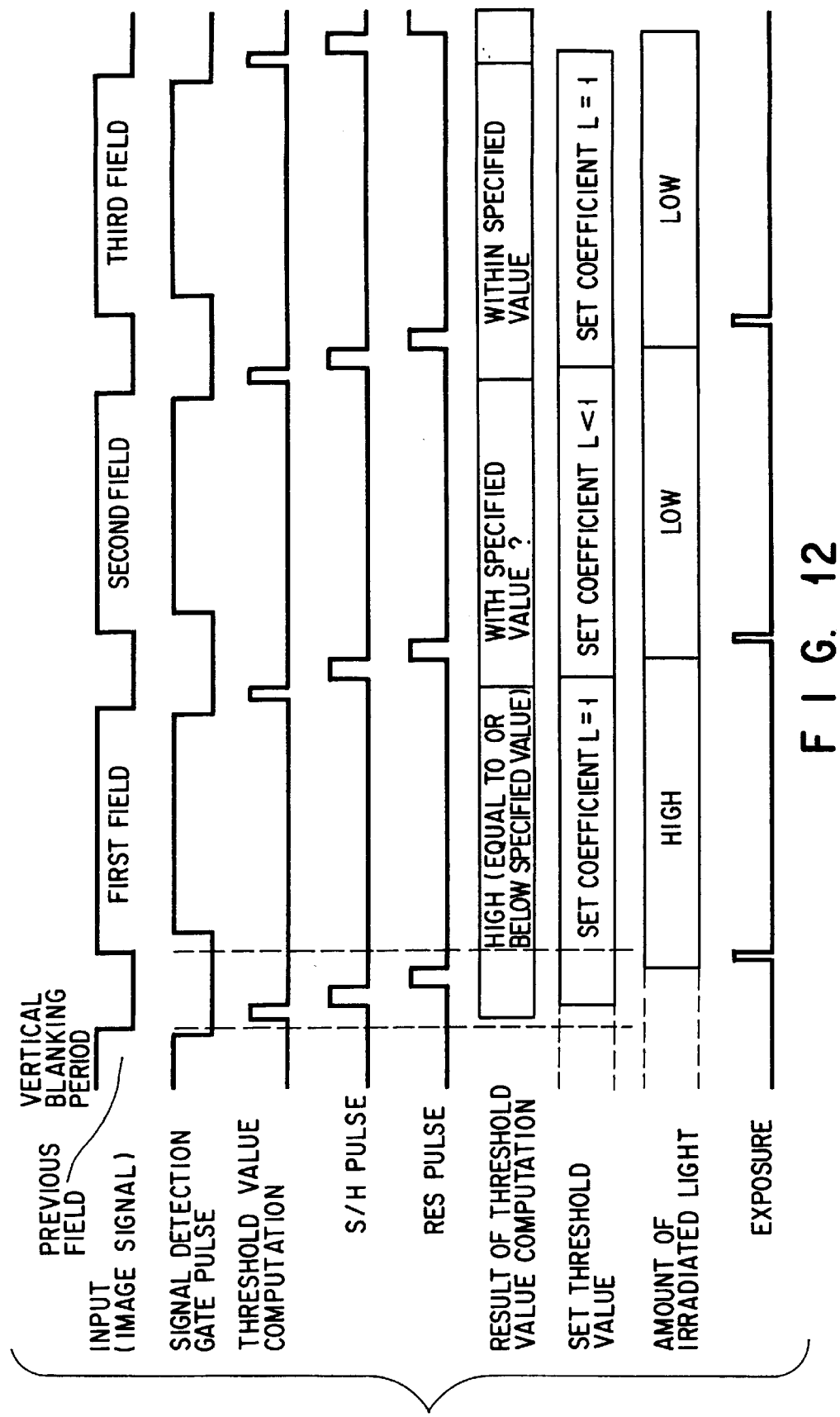
F I G. 12

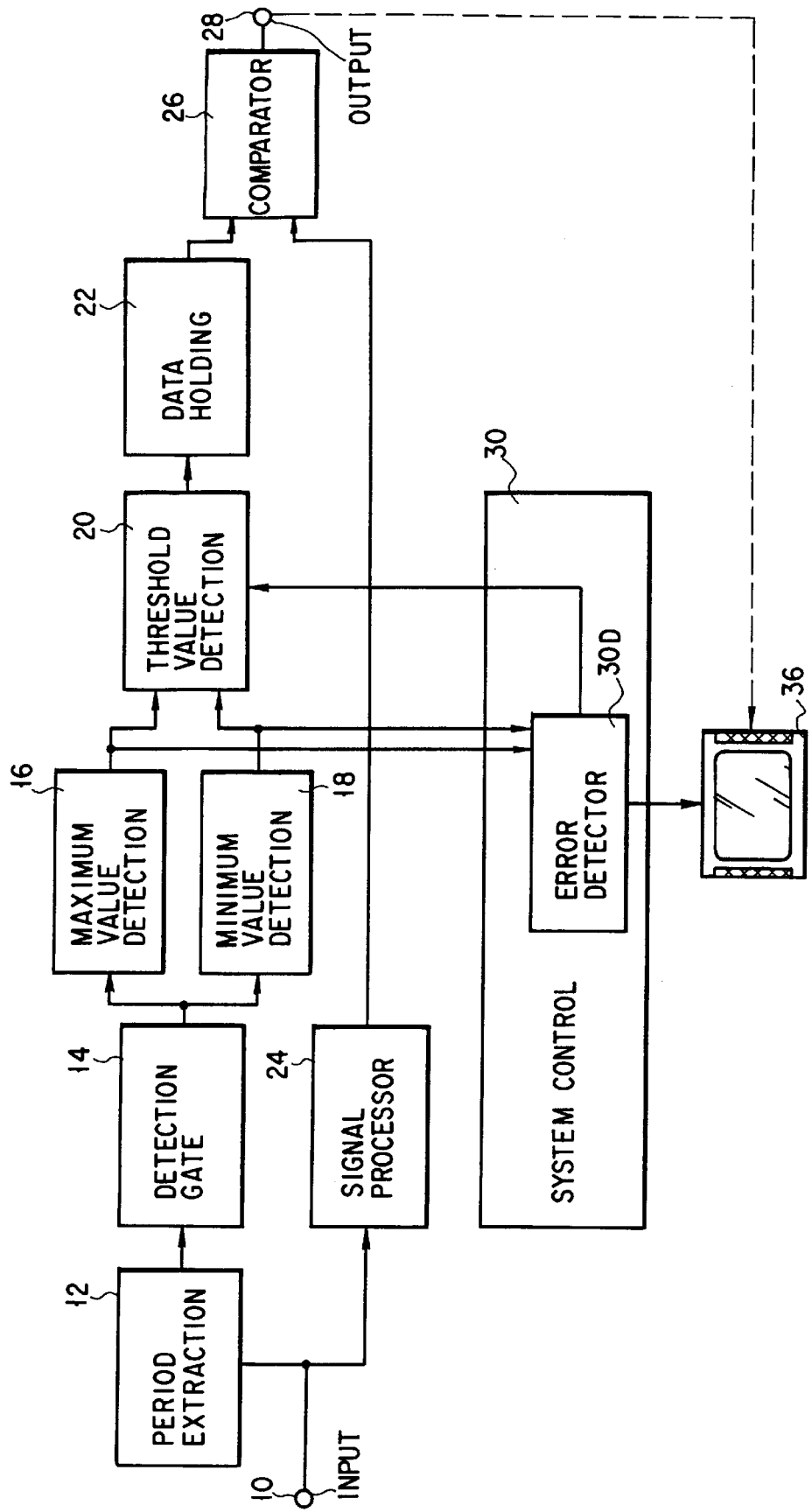
F I G. 15

INFORMATION REPRODUCTION SYSTEM WHICH FEEDBACK CONTROLS A PULSE WIDTH OF LIGHT SOURCE PULSES DURING MANUAL SCANNING OF AN OPTICALLY READABLE DOT CODE

This is a division of application Ser. No. 08/611,653 filed Mar. 6, 1996, now U.S. Pat. No. 5,724,364.

BACKGROUND OF THE INVENTION

1. Field of the Invention

The present invention relates to a binarization circuit, and, more particularly, to a binarization circuit suitable for use in an information reproduction system which can optically read two-dimensional code patterns from information storage media such as a paper sheet on which so-called multimedia information including, e.g., audio information such as speech and music, image information obtained from a camera, a video device, and the like, and digital code data obtained from a personal computer, a wordprocessor, and the like are recorded as optically readable two-dimensional code patterns, thereby reproducing the original multimedia information.

2. Description of the Related Art

Conventionally, various media such as a magnetic tape and an optical disk have been known as media for recording speech and music. However, even if each medium is duplicated in large numbers, its unit price is high to a certain degree, and a large space is required for storing them. When a person needs to give a speech-recorded medium to another at a remote location, this person cannot avoid a cumbersome, time-consuming procedure to accomplish it regardless of whether the medium is mailed or handed. The same is true for so-called multimedia information including, e.g., image information obtained from a camera, a video device, and the like, and digital code data obtained from information processors such as a personal computer and a wordprocessor, other than audio information.

EP 0,670,555 A1 corresponding to U.S. patent application Ser. No. 08/407,018 discloses, as a solution to the above shortcoming, a system which can transmit multimedia information including at least one of audio information, image information, and digital code data via a facsimile, and records image information that can be duplicated in large numbers at a low cost, i.e., a plurality of dots as coded information arranged in a two-dimensional code pattern, on information storage media such as a sheet of paper, and a system for reproducing the recorded information.

In the reproduction system disclosed in the European patent publication, a binarization processing section adaptively performs binarization on an image signal, acquired by sensing the mentioned two-dimensional code pattern, while the threshold value of the image signal is determined by a threshold value determination circuit. As such a binarization processing section, a binarization circuit disclosed in, for example, Jpn. Pat. Appln. KOKAI Publication No. 59-61383, is known. This binarization circuit acquires the maximum value and minimum value of the previous frame of digital data converted by an A/D converter, computes a threshold value from those two values, and performs binarization using this threshold value as the threshold value for the current frame.

According to the reproduction system disclosed in the aforementioned European patent publication, the surface of a sheet as a recording medium is located close to an illuminator and an image pickup section, the image signal acquired from the image pickup section is greatly affected by the regular reflection and includes noise. Further, the image pickup section may have defective pixels, which would appear as noise. Such noise disables the binarization processing section disclosed in the aforementioned Japanese patent publication to accurately acquire the maximum value and minimum value, with the result that binarization will not be executed with the proper threshold value.

SUMMARY OF THE INVENTION

According to the invention, there is provided an information reproduction system comprising a light source for lighting optically readable dot codes in pulses when the dot codes are optically read from a recording medium by manual scanning, wherein the dot codes are recorded on the recording medium to represent multimedia data including at least one of audio data, image data and digital code data. An image pick-up unit picks up images of the dot codes when the dot codes are lit in pulses by the light source during the manual scanning. A processor processes image signals respectively corresponding to the picked up images of the dot codes so as to restore the multimedia data represented by the dot codes. An output device reproduces and outputs the multimedia data based on an output signal from the processor, and a detector detects reflection light amounts from the recording medium having the dot codes recorded thereon when the dot codes are lit in pulses by the light source during the manual scanning. A controller controls a pulse width of the light source pulses in accordance with the reflection light amounts detected by the detector, and the pulse width of the light source pulses is set to correspond to a period of an exposure of the image pick-up unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block structural diagram of a binarization circuit according to the first embodiment of this invention;

FIG. 4 is a diagram for explaining the operation of a period extracting section in FIG. 3;

FIG. 5A is a diagram showing the characteristics of a filter constituting the period extracting section which is designed to extract a marker;

FIG. 5B is a diagram showing the characteristics of a filter constituting the period extracting section which is designed to extract a pattern matching dot (data dot);

FIG. 6 is a block structural diagram of a signal processor in FIG. 3;

FIG. 7 is a diagram for explaining the delay direction;

FIG. 12 is a timing chart for explaining an example of field-by-field control of the amount of light when there is an excessive amount of light;

FIG. 15 is a block structural diagram of a binarization circuit according to the third embodiment of this invention;

DETAILED DESCRIPTION OF THE PREFERRED EMBODIMENTS

Before going into the detailed description of preferred embodiments of the present invention, a two-dimensional code pattern and a multimedia information reproduction system, both of which are disclosed in the aforementioned EP 0,670,555 A1 and to which a binarization circuit embodying this invention is adapted, will be discussed for help readers understand this invention.

Figure 1:
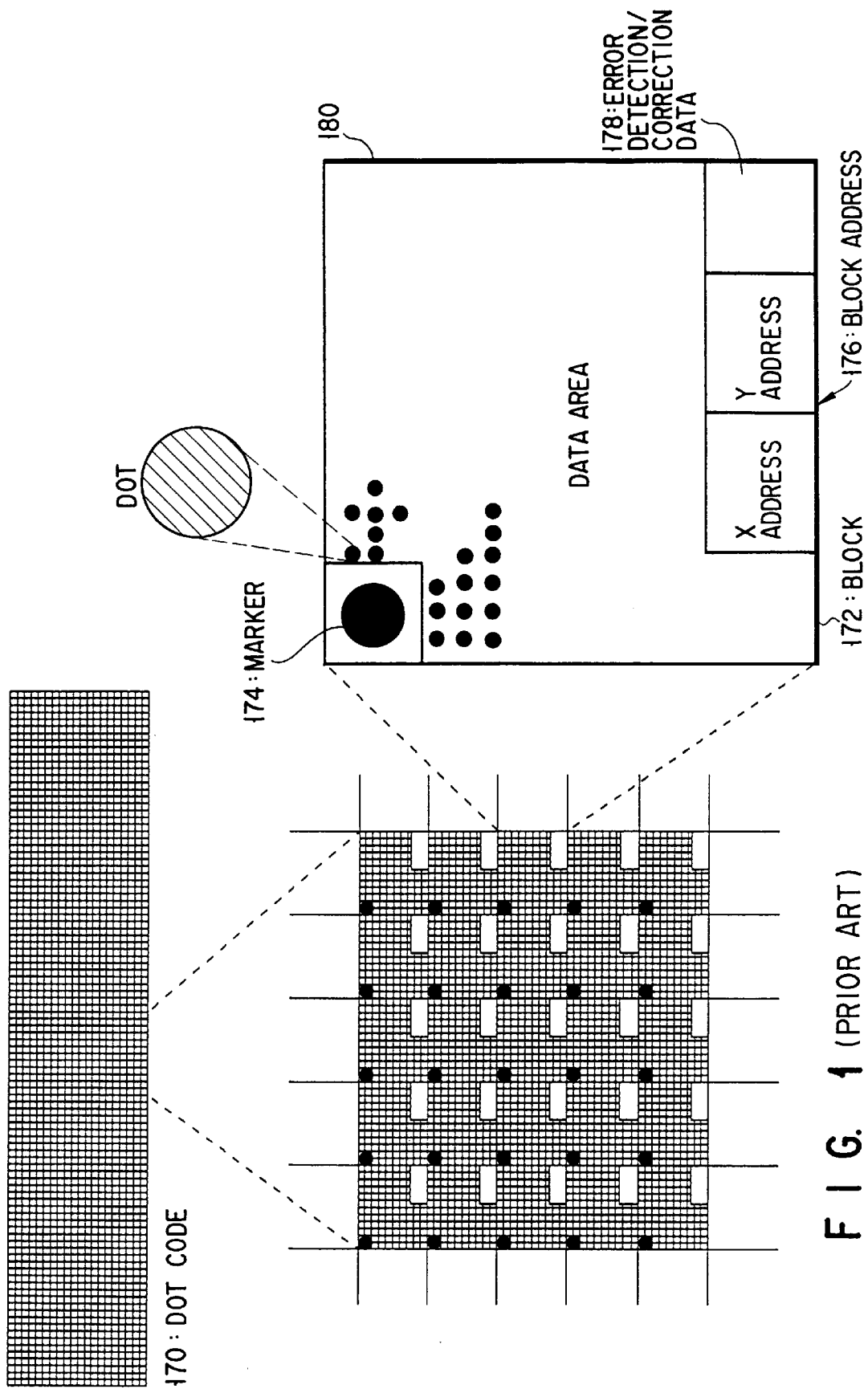
FIG. 1 is a diagram for explaining the format of a dot code which is optically read and reproduced by a multimedia information reproduction apparatus to which a binarization circuit embodying the present invention is adapted.

A two-dimensional code pattern disclosed in this European patent publication is as shown in FIG. 1. FIG. 1, equivalent to FIG. 16 in the European patent publication, shows a dot code 170 as a two-dimensional code pattern. This dot code 170 has such a data format that one block 172 consists of a marker 174, a block address 176, an address error detection/correction data 178, and a data area 180 where actual data is located. The blocks 172 are two-dimensionally arranged to form the dot code 170.

Figure 2:
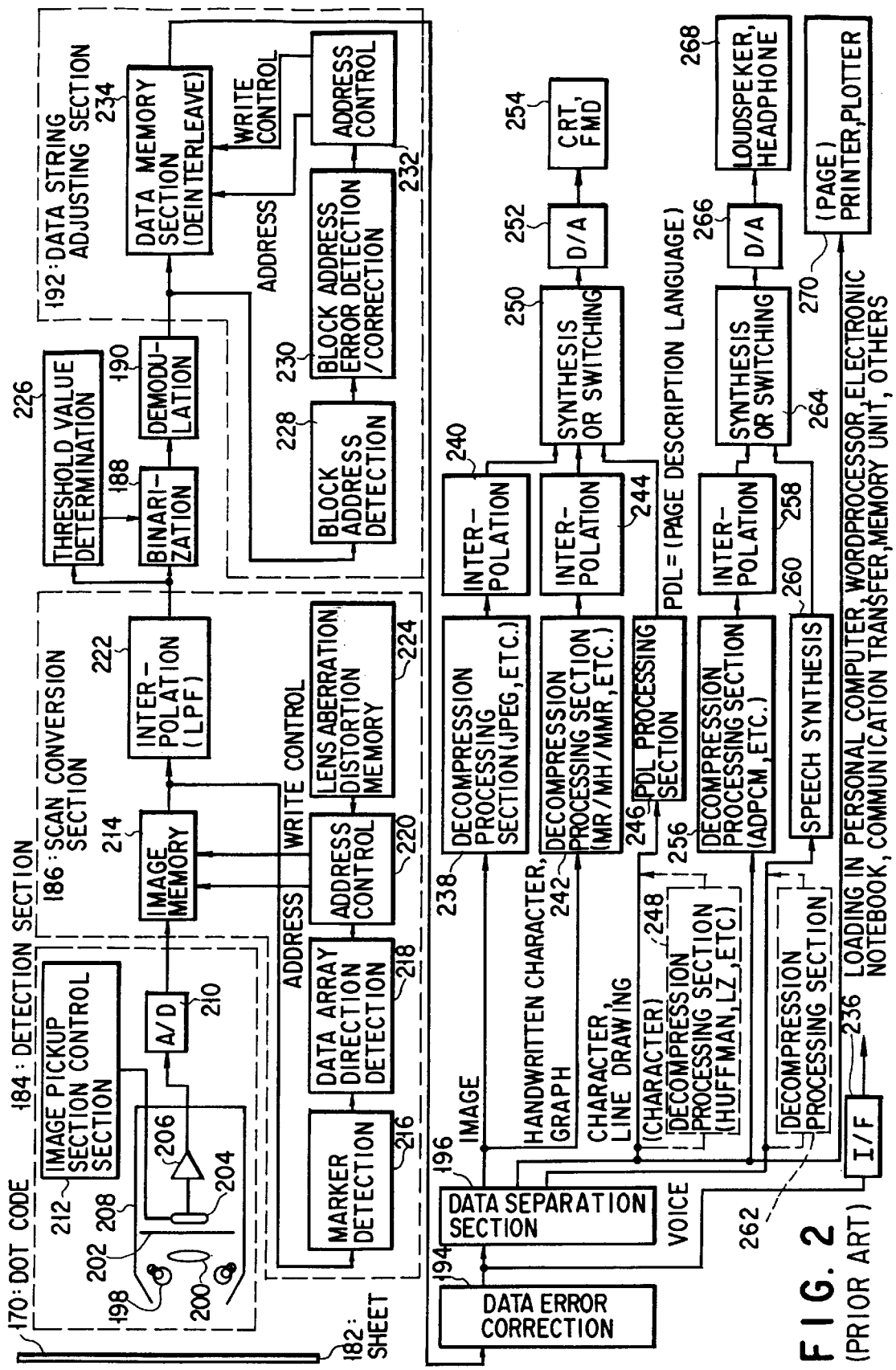
FIG. 2 is a diagram showing the structure of the multimedia information reproduction apparatus to which the binarization circuit embodying the present invention is adapted.

FIG. 2, equivalent to FIG. 17 in the European patent publication, shows the structure of a multimedia information reproduction system. This information reproducing apparatus comprises a detection section 184 for reading a dot code from a sheet 182 on which the dot code 170 is printed, a scan conversion section 186 for recognizing image data supplied from the detection section 184 as a dot code and normalizing it, a binarization processing section 188 for converting multi-value data into binary data, a demodulating section 190, an adjusting section 192 for adjusting a data string, a data error correction section 194 for correcting a read error in a reproducing operation and a data error, a data separation section 196 for separating data in accordance with their attributes, a decompression processing section for performing processing against data compression processing in accordance with the attributes of data, and a display section, a reproducing section, or another input device.

In the detection section 184, the dot code 170 on the sheet 182 is illuminated with a light source 198, and reflected light is detected as an image signal by an image pickup section 204 such as a CCD or a CMD, designed to convert optical information into an electrical signal, via an image formation optical system 200 such as a lens and a spatial filter 202 for removing moire and the like. The image signal is then amplified by a preamplifier 206 and the resultant signal is output. The light source 198, the image formation optical system 200, the spatial filter 202, the image pickup section 204, and the preamplifier 206 are arranged in an external light shielding section 208 for preventing disturbance caused by external light. The image signal amplified by the preamplifier 206 is converted into digital information by an A/D conversing section 210 and supplied to the scan conversion section 186 on the next stage.

Note that the image pickup section 204 is controlled by an image pickup section control section 212. Assume that a CCD of an interline transfer scheme is to be used as the image pickup section 204. In this case, the image pickup section control section 212 outputs the following control signals to the image pickup section 204: a vertical blanking signal for vertical synchronization; an image pickup element reset pulse for resetting information charges; a charge transfer gate pulse signal for transferring charges stored in a two-dimensionally arrayed charge transfer/storage section to a plurality of vertical shift registers; a horizontal charge transfer CLK signal as a transfer clock signal for a horizontal shift register for transferring charges in the horizontal direction and externally outputting them; a vertical charge transfer pulse signal for transferring the charges from the vertical shift registers in the vertical direction and supplying them to the horizontal shift register, and the like.

The image pickup section control section 212 supplies an emission cell control pulse to the light source 198 to adjust the emission timing of the light source 198 in accordance with the above timings.

Image data is read between one field of vertical blanking and the next vertical blanking. The light source 198 executes pulse lighting, not continuous lighting, and executes subsequent pulse lighting actions in synchronism with one another field by field. In this case, the lighting timing is controlled in such a way that to prevent noise generated at pulse lighting from entering the signal output, exposure is effected during vertical blanking or while no image charges are output. The emission cell control pulse is a very narrow, digital clock pulse which is generated instantaneously to given large power to the light source. It is thus necessary to prevent noise originated from the clock pulse from being superimposed on an image signal. As one solution, the light source is driven to effect pulse lighting during vertical blanking. This scheme can improve the S/N ratio. As pulse lighting is to shorten the lighting time, this technique has a great advantage in eliminating the influence of blurring caused by the shaking and movement of the scanning unit in the manual scanning. It is therefore possible to ensure fast scanning.

To minimize the deterioration of the S/N ratio even if disturbance is caused by external light or the like due to some reasons such as the tilting of the detection section 184, though the external light shielding section 208 is provided, an image-pickup element reset pulse is output once to reset an image signal just before the light emission from the light source 198, and light is emitted immediately after the resetting after which data reading is carried out spontaneously, all those actions taken during vertical blanking.

A description will now be given of the scan conversion section 186. The scan conversion section 186 is a section for recognizing image data supplied from the detection section 184 as a dot code, and normalizing it. As a technique for this operation, the image data from the detection section 184 is stored in an image memory 214, read out therefrom temporarily, and supplied to a marker detection section 216. The marker detection section 216 detects a marker of each block. A data array direction detection section 218 detects the rotation or inclination and the array direction of the data by using the markers. An address control section 220 reads out image data from the image memory 214 and supplies the data to an interpolation circuit 222 so as to correct it in accordance with the detection result. At this time, lens aberration information is read out from a memory 224 for correcting the distortion of the aberration of the lens of the image formation optical system 200 of the detection section 184, thereby performing lens correction as well. The interpolation circuit 222 performs interpolation processing of the image data to convert it into an original pattern, i.e., a dot code.

An output from the interpolation circuit 222 is supplied to the binarization processing section 188. The dot code 170 is basically a black and white pattern, i.e., binary information. Therefore, the data is converted into binary data by the binarization processing section 188. At this time, binarization is adaptively performed while threshold value determination is performed by a threshold value determination circuit 226 in consideration of the influences of disturbance, signal amplitude, and the like.

Since modulation has been performed at the recording time, the demodulating section 190 demodulates the data, and inputs the resultant data to the data string adjusting section 192.

In the data string adjusting section 192, the block addresses of the above two-dimensional blocks are detected by a block address detection section 228 first, and error detection and correction of the block addresses are then performed by a block address error detection/correction section 230. Thereafter, an address control section 232 stores the resultant data in a data memory section 234 in units of blocks. By storing the data in units of block addresses in this manner, the data can be efficiently stored even if an intermediate data portion is omitted or data is inserted in the process of storing the data.

After this operation, error correction of the data read out from the data memory section 234 is performed by the data error correction section 194. An output from the data error correction section 194 is branched to two ways. One output is supplied, as digital data, to a personal computer, a wordprocessor, an electronic notebook, or the like. The other output is supplied to the data separation section 196 to be separated into image data, handwritten character or graph data, character or line drawing data, and sound data (including two types, i.e., sound data without any processing and data having undergone speech synthesis).

Image data corresponds to natural image data, which is multi-value image data. A decompression processing section 238 performs decompression processing of this data, which corresponds to JPEG in data compression. In a data interpolation circuit 240, data for which error correction cannot be performed is interpolated.

For binary image information as of a handwritten character or a graph, a decompression processing section 242 performs decompress-ion processing corresponding to MR/MH/MMR in data compression. In a data interpolation circuit 244, data for which error correction cannot be performed is interpolated.

Character or line drawing data is converted into a different pattern for display by a PDL (Page-Description Language) processing section 246. Note that even line drawing or character information which has been coded and undergone compression processing for a code is subjected to corresponding decompression (Huffman coding, Lempel-Ziv coding, or the like) processing in a decompression processing section 248, and is supplied to the PDL processing section 246.

Outputs from the data interpolation circuits 240 and 244 and the PDL processing section 246 are synthesized or selected by a synthesizing/switching circuit 250. The resultant data is converted into an analog signal by a D/A conversion section 252. Thereafter, the corresponding information is displayed on a display section 254 such as a CRT (TV monitor) or an FMD (face mounted display). Note that the FMD is a glasses-type monitor (handy monitor) to be mounted on the face of the user, and can be effectively used for, e.g., a virtual reality operation or looking at an image on a large frame in a narrow place.

Speech information is subjected to decompression processing in a decompression processing section 256, which corresponds to ADPCM. Furthermore, in a data interpolation circuit 258, data for which error correction cannot be performed is interpolated. In performing speech synthesis, a speech synthesis section 260 receives a code for speech synthesis, actually synthesizes speech from the code, and outputs it. In this case, if the code itself is compressed, speech synthesis is performed after decompression processing such as Huffman coding or Lempel-Ziv coding processing is performed in a decompression processing section 262, as in the case of the above character or line drawing information.

Outputs from the data interpolation circuit 258 and the speech synthesis section 260 are synthesized or selected by a synthesizing/switching circuit 264. The resultant data is then converted into an analog signal by a D/A conversion section 266. The signal is output to the loudspeaker 52, the headphone 62 or a speech output device 268 equivalent thereto.

Character of line drawing information is directly output from the data separation section 196 to a page printer or plotter 270. As a result, the character information can be printed, as wordprocessor characters, on a paper sheet, or the line drawing information can be output, as a drawing, from a plotter.

As is apparent, image information can also be printed by a video printer as well as being displayed on a CRT or an FMD, or the image can be photographed.

In this information reproduction system, for example, the detection section 184 and the scan conversion section 186 are accommodated in a pen-like casing to serve as a reading section for optically reading the dot code 170 on the sheet 182, the user holding this reading section manually scans over the sheet 182 along the recorded dot code 170 to read the code.

Preferred embodiments of this invention will now be described with reference to the accompanying drawings.

FIG. 3 illustrates the structure of a binarization circuit according to the first embodiment of this invention, which can serve as the binarization processing section 188 and the threshold value determination circuit 226 shown in FIG. 2.

An image signal input from an input terminal 10 is supplied to a period extracting section 12 which extracts a specific period in an image. This period extracting section 12 can acquire the period of the marker 174 which periodically appears in a dot code as shown in, for example, FIG. 4. When a pattern having the marker 174 and data dots 174A as shown at the top in this diagram is sensed, the actual image acquired from the image pickup section becomes the one shown in the middle part in the diagram. To acquire only the period of the marker 174 from such an image signal, the period extracting section 12 is designed as a low-pass filter. The period extracting section 12 can therefore eliminate a fine pattern like the data dots 174A and provide a signal which shows the amplitude of only the white portion where no dot code is recorded and the marker 174, as indicated at the bottom of FIG. 4.

If a dot code in use has pattern matching dots which are of the same size as the data dots 174A and are arranged in a predetermined pattern at predetermined positions, the period extracting section 12 may be designed to acquire the period of the pattern matching dots. In this case, the period extracting section 12 is constructed as a bandpass filter to extract the period of such a pattern matching code.

FIG. 5A shows the characteristics of a filter constituting the period extracting section 12 which is designed to extract the marker 174, and FIG. 5B shows the characteristics of a filter constituting the period extracting section 12 which is designed to extract a pattern matching dot (data dot 174A). In those examples, the frequency of data from one pixel of the CCD that constitutes the image pickup section is 10 MHz, the data dot 174A has the minimum dot size of three pixels and the marker 174 has a dot size of 21 pixels.

The image signal output from this period extracting section 12 is supplied via a detection gate 14 to a maximum value detection section 16 and a minimum value detection section 18. The detection gate 14 splits the output signal of the period extracting section 12 into predetermined units, e.g., fields or frames. The following description will be given of the case where field-by-field division is employed. Thus, the maximum value detection section 16 and the minimum value detection section 18 respectively detect the maximum value and minimum value of the image signal within one field.

The detected maximum value and minimum value are supplied to a threshold value detection section 20. A threshold value detected by this threshold value detection section 20 is held in a data holding section 22 for the aforementioned predetermined unit or one field. The threshold value detection section 20 computes the threshold value th from the following equation (1), for example, using the maximum value max and minimum value min.

$$th = \min + k(\max - \min) \quad (1)$$

where k is an interior division ratio to determine the threshold value and may be a fixed value or a value adaptively set based on the result of sensing and binarizing a dot of a previously known size.

The image signal input to the input terminal 10 is also supplied to a signal processor 24, which is a wave equalizer, for example, and serves as a filter for increasing the dot period.

The output of the signal processor 24 is compared with the output of the data holding section 22 by a comparator 26, and the comparison result is output as a binary signal from an output terminal 28.

A system control section 30 controls the aforementioned individual sections and always monitors the maximum value max, detected by the maximum value detection section 16, and the minimum value min, detected by the minimum value detection section 18.

The signal processor 24 has a structure as shown in FIG. 6. The input signal is supplied to an adder 24C directly as well as via two delay circuits 24A and 24B. The input signal is delayed by one dot by the two delay circuits 24A and 24B. In other words, the adder 24C adds both sides of the period for one dot. A multiplier 24D multiplies the addition result by a coefficient given from the system control section 30, and the result is supplied to one input of a subtracter 24E. Supplied to the other input of the subtracter 24E is the result of multiplying the output of the delay circuit 24A or the center period for one dot by a coefficient from the system control section 30 by a multiplier 24F. A multiplier 24G multiplies the difference between the multiplication results from the former two amplifiers 24D and 24F by a coefficient from the system control section 30, and outputs the result as the output of the signal processor 24 to the comparator 26.

Instead of supplying the individual coefficients from the system control section 30, the hardware may be modified in such a way that a single coefficient is multiplied at the end.

In short, the first embodiment can eliminate unnecessary noise to extract the specific period in a code, e.g., the period of the marker. In other words, noise-originated malfunction can be prevented so that the proper threshold value can be obtained.

It is to be noted that the delay direction of the delay circuits 24A and 24B is the same one-dimensional direction as the modulation direction of a dot code. That is, the reading direction of the image memory 214 in FIG. 2 is the same as the modulation direction, as shown in FIG. 7. This design allows a simple circuit structure to execute effective wave equalization. As this wave equalizer emphasizes the dot period, the amplitude of the signal of the dot period is amplified to ensure binarization.

Because the image signal to be input to the input terminal has been read out from the image memory 214 of the scan conversion section in accordance with the data arranging direction, it has been mentioned that the reading direction, the modulation direction and the delay direction are the same. If the image signal is directly input from the image pickup section 204, however, the scan direction of the pixels of the CCD of the image pickup section 204 should be made the same as the modulation direction and the delay direction.

The second embodiment of this invention will now be described.

Figure 8:
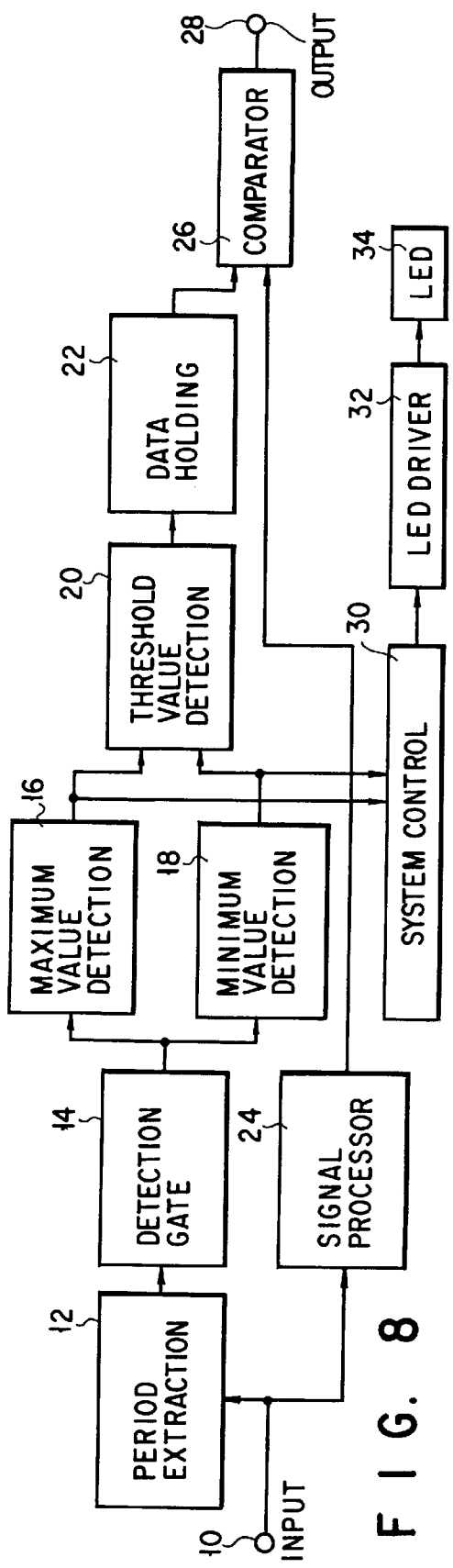
FIG. 8 is a block structural diagram of a binarization circuit according to the second embodiment of this invention.
Figure 10:
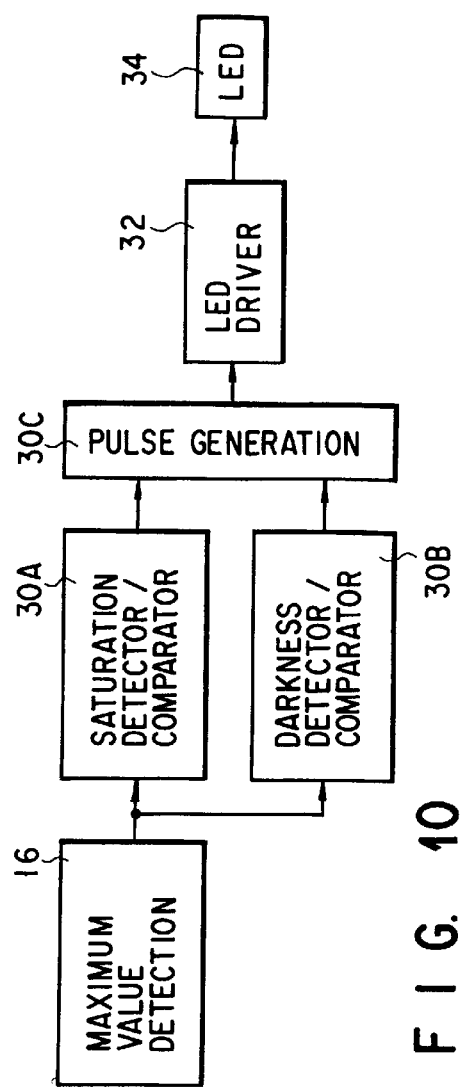
FIG. 10 is a block structural diagram of a system control section in FIG. 8.

FIG. 8 shows the structure of this second embodiment, and uses the same reference numerals as used in FIG. 3 to denote corresponding or identical components to thereby avoid repeating their descriptions.

In the second embodiment, an LED 34 is connected via an LED driver 32 to the system control section 30. That is, the system control section 30 basically performs such control as to vary the amount of light from the LED 34 in accordance with the maximum value detected by the maximum value detection section 16. The LED 34, corresponding to the light source 198 in the structure shown in FIG. 2, serves to illuminate the dot code 170 recorded on the surface of the sheet 182.

Figure 9:
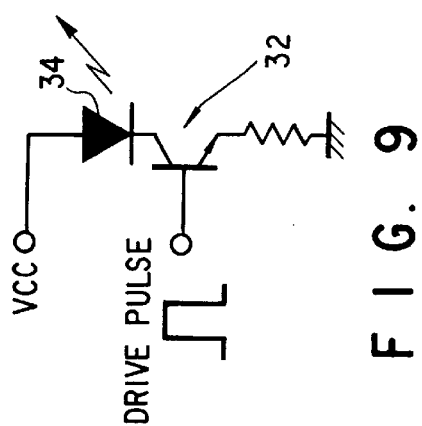
FIG. 9 is a circuit structural diagram of an LED driver in FIG. 8.

The LED driver 32 is comprised of a transistor and a resistor, as shown in FIG. 9, and a drive pulse to the LED driver 32 is given by the system control section 30. In this case, the system control section 30 supplies the maximum value, detected by the maximum value detection section 16, to a saturation detector/comparator 30A and a darkness detector/comparator 30B to check if the maximum value is saturated or indicates a dark output. In accordance with the comparison results, the width or height (amplitude) of the drive pulse which is generated by a pulse generating section 30C is altered.

When the currently emitted light is dark, for example, it is still possible to make the light brighter unless the saturation has occurred at the lowest illumination state, so that the pulse width is changed to increase the amount of light. If the saturation has occurred with the greatest maximum value or with the bright exposure state, on the other hand, it is still possible to make the light darker, so that the pulse width is changed to reduce the amount of light.

As only two detector/comparators are used, the amount of light is controlled in two levels in this embodiment. Increasing the number of detector/comparators can however allow for the discrete control of the amount of light by the increased number. By discretely controlling the amount of light based on the maximum value, the dynamic range of the target signal can be secured to accomplish surer binarization.

Figure 11:
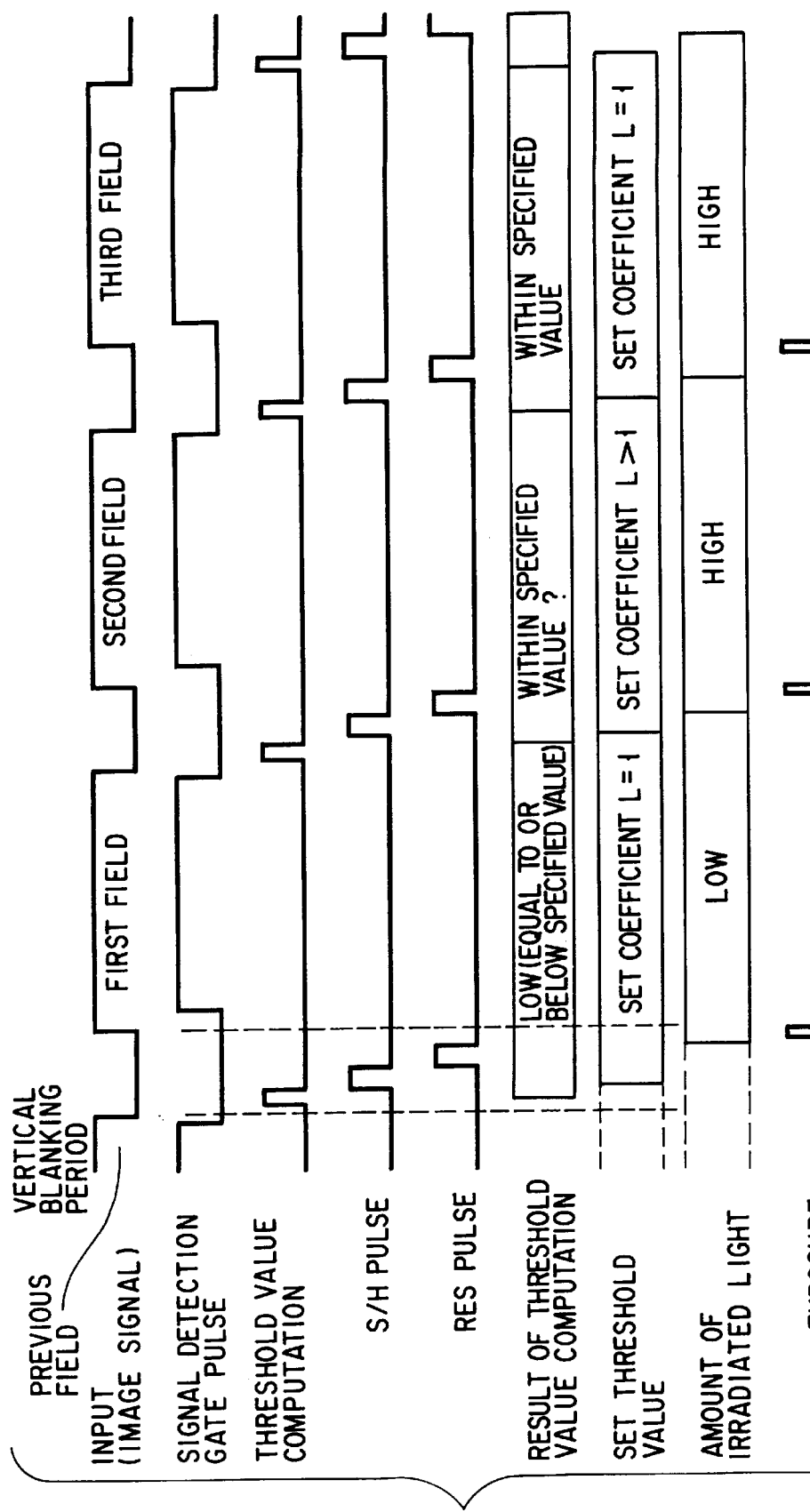
FIG. 11 is a timing chart for explaining an example of field-by-field control of the amount of light when the amount is insufficient.

The control of the amount of light will now be discussed with reference to the timing charts in FIGS. 11 and 12.

In those diagrams, the topmost waveform is an image signal supplied to the input terminal 10; the low-duration period is the vertical blanking period.

The second waveform from the top is a signal detection gate pulse which the system control section 30 supplies to the detection gate 14 to open or close the gate. This signal serves to determine which part of the image signal is to be detected, and goes high field by field. The detection gate 14 supplies the output signal of the period extracting section 12 to the maximum value detection section 16 and minimum value detection section 18 only during this high-duration period.

The third waveform is a threshold value computation signal for controlling the timing of computing the threshold value in the threshold value detection section 20. When this signal is at a high level, the computation is executed. The system control section 30 sets this signal high at a timing in the vertical blanking period.

The fourth waveform is a sample and hold (S/H) pulse for controlling the timing of holding the threshold value to be supplied to the data holding section 22 from the system control section 30. The data holding section 22 samples the result of the computation of the threshold value when this S/H pulse goes high, and holds it for the low-duration period or for one field period.

The fifth waveform is a reset (RES) pulse given to the threshold value detection section 20. When the result of the computation of the threshold value in the threshold value detection section 20 is held in the data holding section 22, that result is no longer needed to be held in the detection section 20 so that the result is reset.

The sixth waveform represents the result of the computation of the threshold value which has been performed in the threshold value detection section 20 and is to be held in the data holding section 22. This waveform has, for example, three statuses: within a preset specified value, equal to or below the specified value (LOW) and above the specified value (HIGH).

The seventh waveform shows the statuses of the set coefficient L which is given as follows. In this embodiment, the threshold value detection section 20 computes the threshold value th from the following equation (2).

$$th = \{min + k(max - min)\}L \qquad (2)$$

This set coefficient L is "1" in the normal state or when the amount of light from the LED 34 has not been changed, and it is set greater than "1" or lower than "1" only for the field for which the amount of light from the LED 34 has been changed.

The eighth waveform represents the amount of irradiated light from the LED 34, and the low state means dark while the high state means bright.

The last and ninth waveform indicates the exposure timing in the image pickup section (not shown).

First, the case where there is an insufficient amount of light will be described referring to FIG. 11.

The computation of the threshold value in the threshold value detection section 20 is executed from the equation (2) during the vertical blanking period between the field indicated as the "PREVIOUS FIELD" and the field indicated by the "FIRST FIELD," based on the maximum value and minimum value which have been acquired from the image signal of the previous field. When the result of this computation is equal to or below a specified value, which means that it is very dark, the proper binarization will not be accomplished if the image pickup continues with this amount of light. Accordingly, such control as to increase the amount of irradiated light from the LED 34 is to be executed. Because the processing is carried out field by field in this embodiment, the amount of light is kept low in the first field and is set to high before the second field begins.

However, the computation of the threshold value which is executed in the vertical blanking period between the first and second fields is based on the image signal of the first field that has been exposed in the vertical blanking period between the first and second fields. By way of comparison, the signal which is actually binarized by the comparator 26 is the image signal of the second field that has been exposed in the vertical blanking period between the first and second fields or that has been exposed with the amount of irradiated light at the high state. In other words, although the image signal becomes high, the threshold value stays the same as the previous one, disabling the proper binarization. With regard to the second field, therefore, the value of the set coefficient L is set equal to or greater than "1." This way, it becomes possible to properly read even data in the field where the insufficient amount of light has been detected and the amount of irradiation is changed to the high state from the low state.

As is apparent from the above, the value of the set coefficient L is set equal to or greater than "1" only for the field where the amount of light has been changed to the high state from the low state. For example, if the amount of light irradiation increases by 15%, the value of the set coefficient L is set to "1.15." Of course, this value should be set to the proper one in accordance with the structure of the reproduction apparatus to which this invention is to be adapted.

As the amount of light has not changed for the second field and the third field, the value of the set coefficient L is set back to the original value "1."

The case of over irradiation will now be discussed referring to the timing chart in FIG. 12 which is basically the same as the one in FIG. 11.

In this example, when the illumination of the LED 34 is made darker because it has been too bright, the light amount control is executed in such a way that the value of the set coefficient L of the second field is set below "1" and it is set back to "1" in the third field.

Although the amount of light of the LED 34 can be changed by altering the amplitude of the pulse generated by the pulse generation section 30C, the pulse width or the light emission time cannot be increased limitlessly, even if it is dark, because of the characteristic of dot codes.

Figure 13:
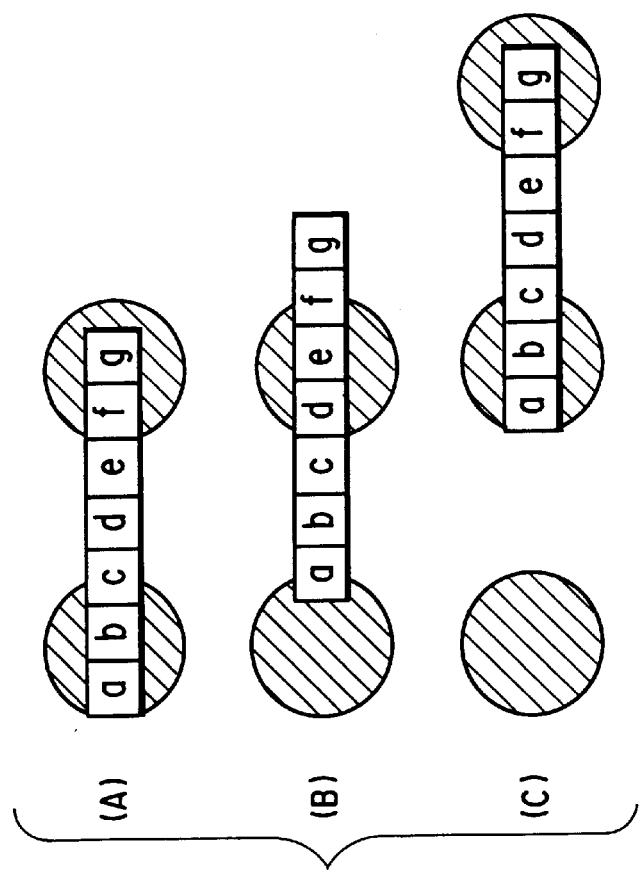
FIG. 13 is diagram illustrating the positional relation between individual dots and an image pickup element when image sensing is performed while scanning dot codes.

When a dot code is manually scanned and sensed, the positional relationship between each dot in the dot code and the image pickup section varies from time to time during one exposure period. Suppose that the current state (A) in FIG. 13 is changed to the state (A), (B) or (C) during one exposure period. In the diagram, "a," "b," "c," "d," "e" "f" and "g" indicate pixels of, for example, the CCD in the image pickup section.

Figure 14:
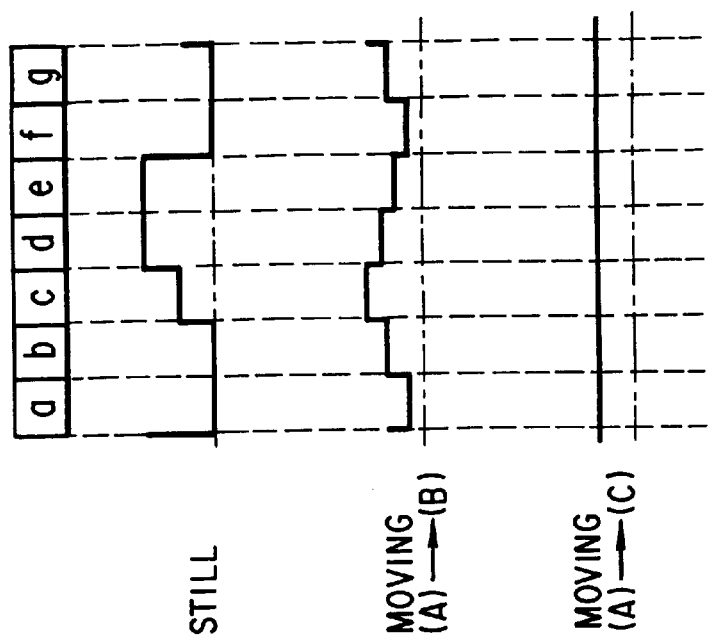
FIG. 14 is a diagram for explaining the relationship between the scanning speed and a sensed image output signal.

When the state (A) is changed to the state (A) in one exposure period, i.e., when it is a still state, the accumulated outputs of the individual pixels become as indicated by the first waveform in FIG. 14; the outputs of the pixels a, b, f and g will have values (amplitudes) equivalent to black, the outputs of the pixels d and e will have values (amplitudes) equivalent to white, and the output of the pixel c will have an intermediate value (amplitude). That is, the dot cycle is saved by the pixels a to e.

When the state (A) is changed to the state (B) in one exposure period, the accumulated output of the pixel a will take a value substantially equivalent to black as the pixel a substantially passes only the black portion, and the output of the pixel b will have a value between those for black and white as the pixel b has moved to the center of the white part from the center of the black dot. Because the length from the pixel a to the pixel e nearly becomes one period, the period is likewise saved. Even if manual scanning which causes the transition from the state (A) to the state (B) during one exposure period is executed, therefore, the period is saved though the amplitude decreases. Thus, there still is a chance for the proper dot detection.

When the state (A) is changed to the state (C) in one exposure period, however, all the pixels similarly pass between black and white. The potential of the accumulated output becomes flat and has an intermediate value as indicated by the last waveform shown in FIG. 14. That is, when the amount of movement in one exposure time becomes too large, blurring occurs, thus disabling the dot detection.

Therefore, the length of one exposure time or the time of the light emission of the LED 34 should be controlled in the range where dots can be detected when manual scanning is conducted at the maximum scan speed which has been previously defined according to the apparatus and at which no block skip would occur. That is, as the amount of movement increases, the amplitude becomes smaller as shown in FIG. 14, and the contrast ratio becomes zero, thus disabling the dot detection, so that the time of the light emission of the LED 34 should be defined within the maximum allowable amount of movement which provides a certain or greater contrast. It is confirmed through the experiments that the maximum allowable amount of movement is approximately ¾ of one dot.

The third embodiment will now be discussed.

FIG. 15 shows the structure of this third embodiment, and uses the same reference numerals as used for the first embodiment in FIG. 3 to denote corresponding or identical components to thereby avoid repeating their descriptions.

In the third embodiment, the system control section 30 is provided with an error detection section 30D. This error detection section 30D receives the maximum value and minimum value of the image signal, detected by the maximum value detection section 16 and the minimum value detection section 18, and detects if the dot code has been properly read. If it is detected that the dot code has been detected improperly, the error detection section 30D sends an error signal to the threshold value detection section 20, displays information of no dot code having been scanned on a monitor 36 which outputs multimedia information reproduced by the subsequent processing to the binarization of the binarization circuit, or generates an error sound to inform the occurrence of an error.

When the minimum value is greater than expected, for example, it means that something white has been scanned. In this case, the error detection section 30D causes the threshold value detection section 20 to output a certain fixed threshold value and causes the monitor 36 to display that what has been scanned is not a dot code.

When the maximum value is smaller than expected, on the other hand, it means that a black portion has been scanned or the light emitted from the light source has not returned, i.e., it means that the image pickup section is not sensing a medium. In such a case too, the error detection section 30D causes the monitor 36 to display that no dot code has been scanned or forces the threshold value detection section 20 to output a certain fixed threshold value.

Even if only white parts or black parts are sensed, those parts always have a maximum value and minimum value. If the threshold value detection section 20 computes the threshold value using those maximum and minimum values, the undulation on the surface of the medium is output as a binary signal. The aforementioned fixed threshold value is output to eliminate such a possibility.

The fourth embodiment will now be discussed.

Figure 16:
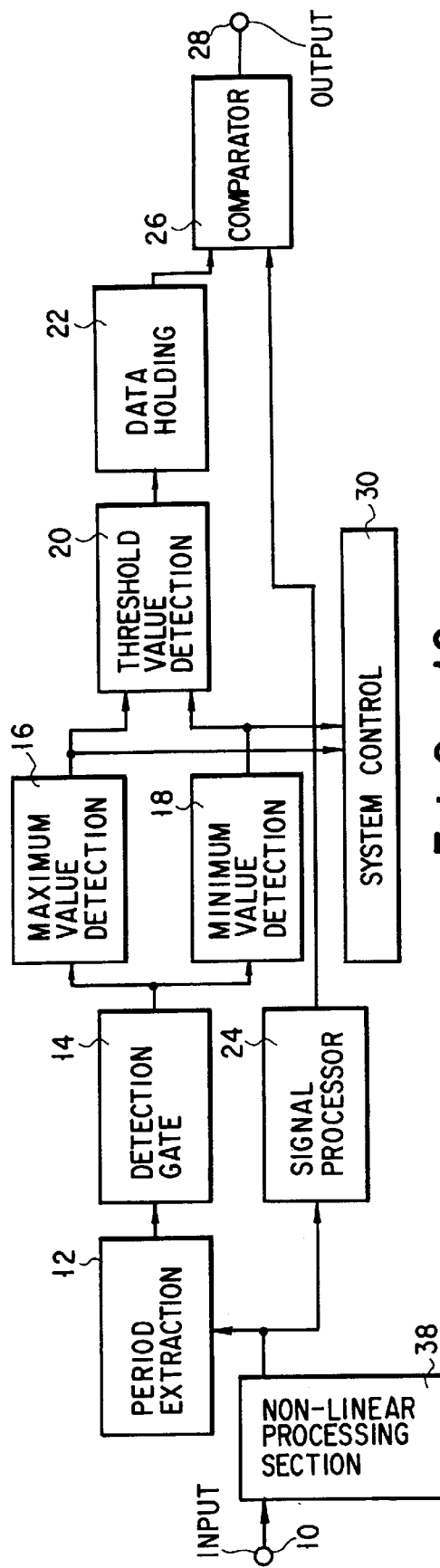
FIG. 16 is a block structural diagram of a binarization circuit according to the fourth embodiment of this invention.

FIG. 16 shows the structure of this fourth embodiment, and uses the same reference numerals as used for the first embodiment in FIG. 3 to denote corresponding or identical components to thereby avoid repeating their descriptions.

In the fourth embodiment, a non-linear processing section 38 is provided at the preceding stage of the period extracting section 12 and the signal processor 24.

Figure 17A:
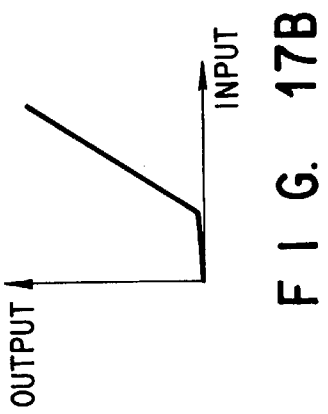
FIGS. 17A and 17B are diagrams for explaining a nonlinear processing section in FIG. 16.
Figure 17B:
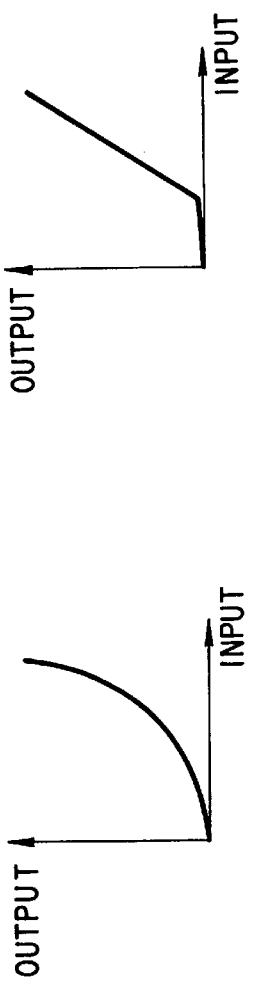

When a dot code recorded by ink on the surface of a sheet is actually sensed, ink does not necessary be black as is defined for image signals, and the base is slightly lifted as shown in FIG. 17A. This non-linear processing section 38 performs processing to suppress that level close to the black level to a certain degree, as shown in FIG. 17B. As a result, the white-black contrast ratio is improved, thus facilitating the binarization.

It is to be noted that the above-described binarization circuits of the first to fourth embodiments can be constituted of a digital processing circuit as well as an analog circuit, which can properly be selected in accordance with the apparatus to which this invention is to be adapted.

This invention is not limited to the above-described four embodiments, but may be modified and applied in various other forms within the scope and spirit of the invention. The following will summarize the subject matter of this invention.

(1) A binarization circuit for use in an information reproduction system comprising reading means for optically scanning and reading a dot code from a recording medium on which multimedia information including at least audio information, image information and digital code data is recorded in optically readable dot codes, a binarization circuit for binarizing an image signal corresponding to the dot code read by the reading means, processing means for performing a predetermined process on binary data from the binarization circuit to restore the binary data to original multimedia information, and output means for reproducing and outputting each pieces of multimedia information based on an output signal of the processing means, the binarization circuit comprising:

a filter for extracting a specific period in the dot code in an image signal corresponding to the dot code read by the reading means;

maximum value/minimum value detection means for detecting a maximum value and a minimum value in a predetermined unit of the specific period extracted by the filter;

threshold value computing means for computing a threshold value for binarization from the maximum value and minimum value detected by the maximum value/minimum value detection means; and binarization means for binarizing the image signal corresponding to the dot code read by the reading means with the threshold value computed by the threshold value computing means.

As a specific period in a dot code is extracted, noise-originated erroneous detection can be prevented.

(2) The binarization circuit according to paragraph (1), which further comprises a signal processor for receiving an image signal corresponding to the dot code read by the reading means and supplying a resultant signal of one-dimensional wave equalization of the image signal in a same direction as a modulation direction of the dot code, as a signal to be binarized.

Because the scanning direction of the two-dimensional image pickup element of the reading means is the same as the modulation direction, small but effective wave equalization can be executed in the one-dimensional wave equalizing process.

(3) The binarization circuit according to paragraph (1), wherein the dot code has a data code equivalent to a content of multimedia information to be reproduced and a marker located at a predetermined position with respect to the data code for determining a reference reading point; and wherein the filter is designed to extract a period of the marker.

As the period of the marker is acquired, unnecessary noise can be removed and the proper threshold value can be obtained.

(4) The binarization circuit according to paragraph (2), wherein the wave equalization in the signal processor emphasizes a dot period of the dot code.

As the amplitude of the signal with the dot period is amplified, surer binarization can be performed.

(5) The binarization circuit according to paragraph (1), which further comprises light amount control means for discretely controlling an amount of light of a light source as an element of the reading means, based on the maximum value detected by the maximum value/minimum value detection means.

As the dynamic range of the signal can be secured, surer binarization can be performed.

(6) The binarization circuit according to paragraph (5), wherein the light amount control means controls the amount of light in two levels.

This design can simplify the circuit structure and allows the dynamic range to be secured by a small-scale circuit.

(7) The binarization circuit according to paragraph (5), which further comprises means for altering the threshold value computed by the threshold value computing means based on a change in the amount of light caused by the light amount control means.

This structure allows an input signal immediately after the light amount control operation to be accurately binarized.

(8) The binarization circuit according to paragraph (1), which further comprises means for detecting an error from a relationship between the maximum value and minimum value detected by the maximum value/minimum value detection means.

This structure allows the detection of if the acquired input signal is not the signal of two-dimensional data (all black, all white or between black and white). It is also possible to detect if the amount of light under control is proper.

(9) The binarization circuit according to paragraph (1), which further comprises means, provided at a preceding stage of the filter, for performing a non-linear process on the image signal corresponding to the dot code read by the reading means.

By compressing the black level, the contrast is improved, thus ensuring more accurate binarization.

(10) The binarization circuit according to paragraph (1), wherein the threshold value computing means computes the threshold value in a vertical blanking period.

With this structure, it is possible to complete the computation for the threshold value that is necessary for the binarization during the blanking period of the scanning operation to reproduce two-dimensional data.

(11) The binarization circuit according to paragraph (5), wherein the light amount control means includes exposure time control means for controlling an amount of light based on an exposure time, and the exposure time control means defines an exposure control time range within a maximum allowable amount of movement during exposure in consideration of movement-originated blurring at a maximum scan speed.

This structure suppresses the occurrence of blurring caused by the movement of the apparatus, thus ensuring more accurate binarization.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reproduction system comprising:
   a light source for lighting optically readable dot codes in pulses when the dot codes are optically read from a recording medium by manual scanning, said recording medium having the dot codes recorded thereon to represent multimedia data including at least one of audio data, image data and digital code data;
   an image pick-up unit which picks up images of the dot codes when the dot codes are lit in pulses by said light source during the manual scanning;
   a processor which processes image signals respectively corresponding to the picked up images of the dot codes so as to restore the multimedia data represented by the dot codes;
   an output device which reproduces and outputs the multimedia data based on an output signal from said processor;
   a detector which detects reflection light amounts from the recording medium having the dot codes recorded thereon when the dot codes are lit in pulses by said light source during the manual scanning; and
   a controller which controls a pulse width of said light source pulses in accordance with the reflection light amounts detected by said detector,
   wherein the pulse width of said light source pulses is set to correspond to a period of an exposure of said image pick-up unit.

2. An information reproduction system according to claim 1, wherein a maximum value of the pulse width of said light source pulses is defined within a range of a maximum allowance moving amount, which is set in consideration of blurring that occurs when the dot codes are manually scanned at a predetermined maximum scanning speed.

3. An information reproduction system according to claim 1, wherein said detector detects a maximum value of the reflection light amounts.

4. An information reproduction system according to claim 1, wherein said controller discretely controls the pulse width of said light source pulses.

* * * * *